Feb. 22, 1927.

J. HERMAN

TELEGRAPH SYSTEM

Filed Feb. 28, 1924

INVENTOR
J. Herman
BY
ATTORNEY

Feb. 22, 1927.

J. HERMAN

TELEGRAPH SYSTEM

Filed Feb. 28, 1924      8 Sheets-Sheet 7

INVENTOR
J. Herman
BY
ATTORNEY

Patented Feb. 22, 1927.

1,618,193

UNITED STATES PATENT OFFICE.

JOSEPH HERMAN, OF NEW YORK, N. Y., ASSIGNOR TO AMERICAN TELEPHONE AND TELEGRAPH COMPANY, A CORPORATION OF NEW YORK.

TELEGRAPH SYSTEM.

Application filed February 28, 1924. Serial No. 695,767.

A principal object of my invention is to provide a new and improved system of telegraph signaling. Another object of my invention is to provide for telegraph signaling by means of a code employing currents of several different magnitudes. Another object of my invention is to provide for efficient magnitude discrimination among the current impulses in telegraph signaling. Another object is to increase the signaling speed in a message channel by employing a considerable number of current magnitudes on the line. Still another object of my invention is to provide for economy of line time by the use of a code employing several different current magnitudes with effective discrimination between them. These objects and various other objects of my invention will become apparent on consideration of a limited number of embodiments which are illustrated in the accompanying drawings and described in the following specification. It will be understood that the following disclosure relates to these particular examples of the invention and that the invention will be defined in the appended claims.

Referring to the drawings.

Figure 1:
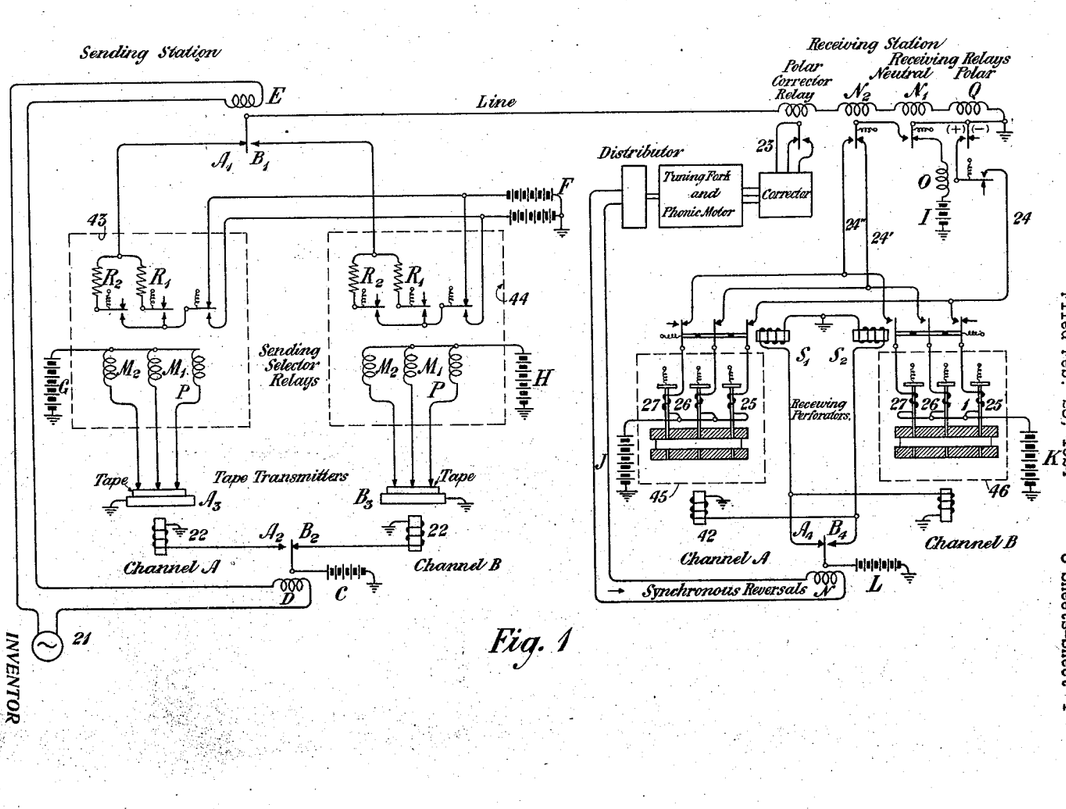
Figure 1 is a diagram of a two-channel system employing five distinct current magnitudes and using neutral relays at the receiving station.

Referring to Fig. 1, this shows a transmission line with means at the sending station to connect it alternately for two different channels which may be distinguished as "channel A" and "channel B". The alternating current generator 21 sends its current to the relays D and E. While the line is connected to contact $A_1$, the battery C is connected to contact $B_2$, and an instant later while the line is connected to contact $B_1$, the battery C is connected to contact $A_2$.

Figure 9:
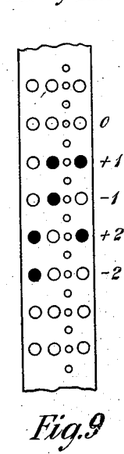
Fig. 9, 10, 11 and 12 show punched tapes such as may be employed with the systems of the foregoing figures.

Transmission is effected by means of a prepared tape as shown in Fig. 9. Five different current impulses can be put on the line at the sending station, namely current of magnitudes 0, +1, −1, +2 and −2. These are determined, respectively, by different code combinations punched in the tape of Fig. 9.

At the same time that the line is connected for channel A at contact $A_1$, the battery C is connected to energize the tape feed magnet 22 in the tape transmitter $B_3$ of channel B. Thus, contacts are established at $B_3$ in accordance with the holes punched in the tape for channel B, and the corresponding relays $M_2$, $M_1$ and P are energized (or not energized) accordingly.

Now upon the next current reversal from generator 21 the contact of the battery C is shifted from $B_2$ to $A_2$ and the connection of the line is shifted from $A_1$ to $B_1$. Accordingly, for the duration of the contact at $B_1$, a current impulse will be sent over the line from the battery F which will be plus or minus as the relay P is energized or not energized, and will be of magnitude 1 when relay $M_1$, but not $M_2$, is energized, and will be of magnitude 2 when relay $M_2$ is energized. Also, the case must be held in view that if neither relay $M_1$ nor $M_2$ is energized, the current will be of zero magnitude.

The tape transmitter employed may be of the well known used in printing telegraphy, in which the contacts set up by the feed magnet 22 remain closed after the feed magnet 22 is deenergized; then when it is reenergized, those contacts are broken, the tape is stepped along one step and the corresponding contacts at the new position are established.

It will be seen that at the sending station, while an impulse of one of five magnitudes is being sent over the line for one channel, readjustments are being made for the other channel to determine the succeeding impulse to go over the line. Thus there is no loss of line time in setting up the code combinations at the sending station. As already pointed out, each current impulse is of one of five different current magnitudes. Two successive impulses will, accordingly, give twenty-five combinations, which may be taken to represent twenty-five letters of the alphabet or other symbols, one of which may advantageously be a "shift" combination to indicate that the combination following is one of twenty-five of a less used set of letters, punctuations, etc. Thus it will be seen that in each channel two successive units of line time may be employed generally to transmit a letter or corresponding symbol, and that exceptionally three units may be required, one of these being for the shift combination.

At the receiving station the current goes through four relays in series. One of these is a polar corrector which is relied upon to establish synchronous reversals from a source of current to the relay N. The associated synchronizing apparatus designated 23 is familiar in the art of printing telegraphy and will not be described here. Suffice it to say that the relay N is operated in synchronism with the sending relay E. Relay $N_1$ operates on any normal magnitude of current other than zero. Relay $N_2$ is marginal and operates only on current of magnitude 2.

To illustrate the operation of the receiving station, assume that a positive current of magnitude 2 is received over the line in channel A. At this time the relay N will connect the battery L with contact $A_4$, operating switch $S_1$ to close the contacts controlled thereby. The relay Q is a polar relay which closes on the contact marked (+) or the contact marked (—), according as the current through it is plus or minus. Hence the impulse of positive current of magnitude 2 that we are considering will shift the armatures of all three relays $N_2$, $N_1$ and Q from the positions shown in Fig. 1. (If the current had been of magnitude 1, relay $N_1$ would have operated but not $N_2$. Relays $N_2$ and $N_1$ operate alike for positive and negative impulses but Q will operate as described only for positive impulses.)

Accordingly, a circuit is established from ground, through the armature of relay Q, armature of relay O (on its back contact, because the circuit for O is open at the armature of relay $N_1$), through conductor 24, contact of switch $S_1$ to the winding of plunger 25 and battery J. This produces a corresponding perforation in the receiving tape for channel A.

Another circuit may be traced from ground, through the armature of relay $N_1$, armature of relay $N_2$, conductor 24″, corresponding contact of switch $S_1$ and winding of plunger 27 to battery J. This causes a corresponding hole to be punched in the receiving tape.

If the current had been negative and of magnitude 1, the circuit of plunger 25 would have been open at relay Q. Also, the circuit of plunger 27 would have been open at relay $N_2$ but the circuit of plunger 26 would have been closed through the back contact of relay $N_2$ and the front contact of relay $N_1$; in this case a hole would have been punched at the middle position on the receiving tape.

If no current had been transmitted, in other words for current magnitude zero, the armature of relay $N_1$ would have remained on its back contact so that neither plunger 26 nor 27 would have been energized. But since relay Q is of the polar type, it might have remained on its plus contact; however, relay O would be energized at such time and would open the circuit for the plunger 25 at this point even though it might be closed at relay Q.

When the relay E at the sending station changes the connection from contact $A_1$ to contact $B_1$, the relay N at the receiving station changes the connection of battery L from contact $A_4$ to contact $B_4$. Accordingly, switch $S_1$ opens and switch $S_2$ closes. Thus while the perforators for channel B are being operated, those for channel A are releasing due to the opening of the switch $S_1$ and the corresponding tape feed magnet 42 is also energized from battery L to step the tape for channel A ahead in readiness for the next received impulse in that channel.

Following the convention suggested in connection with the description of the sending station, two successive impulses may represent any one of twenty-five characters and, accordingly, the two successive impulses as recorded in two successive combinations on the receiving tape may be read directly by one familiar with the code, or the tape can be put through a printer to print the message according to well known practice.

Figure 2:
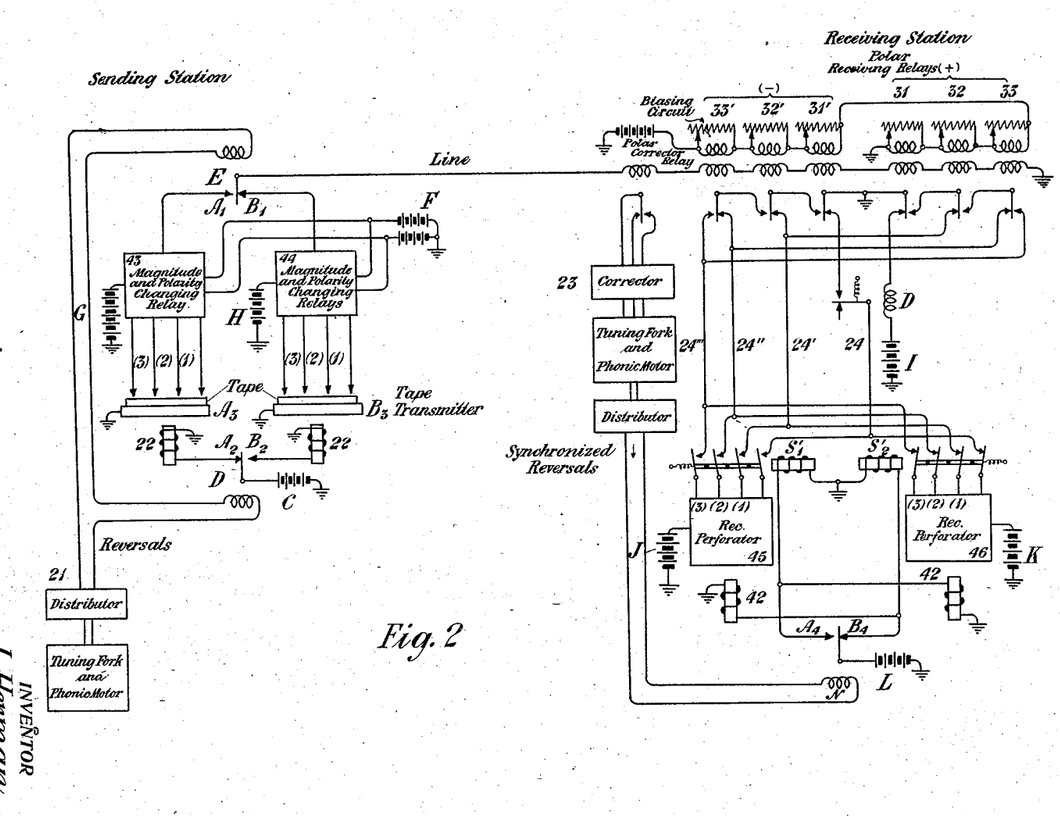
Fig. 2 is a diagram of a similar system except that polar relays are employed at the receiving station.

Referring to Fig. 2, this shows a sending station like that of Fig. 1 except that here seven different current magnitudes are employed instead of five, these seven current magnitudes being 0, +1, —1, +2, —2, +3 and —3. The apparatus in the boxes of Fig. 2 marked 43 and 44 corresponds to the apparatus in the like designated dotted rectangles of Fig. 1 except for the change to take care of the extra current magnitudes +3 and —3.

Figure 10:
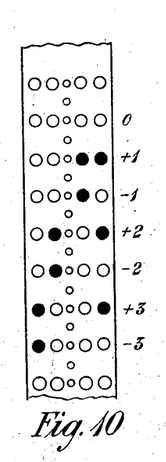

The sending or receiving tape for Fig. 2 will appear as shown in Fig. 10, with a transverse row of four holes (or positions for holes) for each current impulse, that is, for each unit of line time. For the seven different current strengths on one impulse, forty-nine combinations will be possible on two successive impulses. Accordingly, two successive impulses will give a code of forty-nine different letters or symbols which will be adequate for many purposes.

On some telegraph circuits, where the received currents are rather small, it may be desirable to use sensitive polar relays instead of neutral relays for the magnitude discriminations at the receiving station. One advantage of polar relays over neutral relays lies in the fact that the operating and non-operating currents values can be accurately controlled by adjustments in a biasing circuit. The use of polar receiving relays is shown at the receiving station in Fig. 2. Each receiving relay has two windings, one in the main line and the other in a biasing circuit. Each of the biasing windings is shunted by an adjustable resistance. For three of the six receiving relays the biasing current goes one way and for the remaining three it goes the other way, so that the relays 31, 32 and 33 will respond only to positive impulses, while the relays 31', 32' and 33' will respond only to negatives impulses. The armatures for all six of these relays are shown in Fig. 2 in their non-operated positions. It will be seen that each pair of non-operated contacts for positive and negative relays of corresponding magnitude above the first magnitude are connected together. Each operated contact of a relay which operates on one polarity is connected to the armature of the next higher relay of the same polarity, and the operated contacts of the highest magnitude relays are connected together.

For any positive impulse the armature of the negative relay 31' will be on its non-operated contact and the armature of the positive relay 31 will be on its operated contact. The circuit of the plunger 25 (compare the boxes 25 in Figs. 1 and 2) as determined by switch $S_1$ or $S_2$ for channel A or channel B will then be made from ground, through the armature of relay 31' and through the back contact of relay O (because relay O will be deenergized at this time due to the energization of relay 31). On the other hand, when the current is negative, relay O will be energized, opening the circuit for the plunger determined by the switch $S_1$ or $S_2$. The operation of the other plungers of the perforators will be evident from the diagram and from the description that has been given for Fig. 1. When the line current is zero, the armatures of both relays 31 and 31' will have the positions shown in Fig. 2 and hence the circuit of the plunger will be opened by relay O.

The tapes punched at the receiving end in the two channels of Fig. 2 will be as indicated in Fig. 10 and they may be read directly by one familar with the code or they may be put through a printer according to well known practice.

Figure 3:
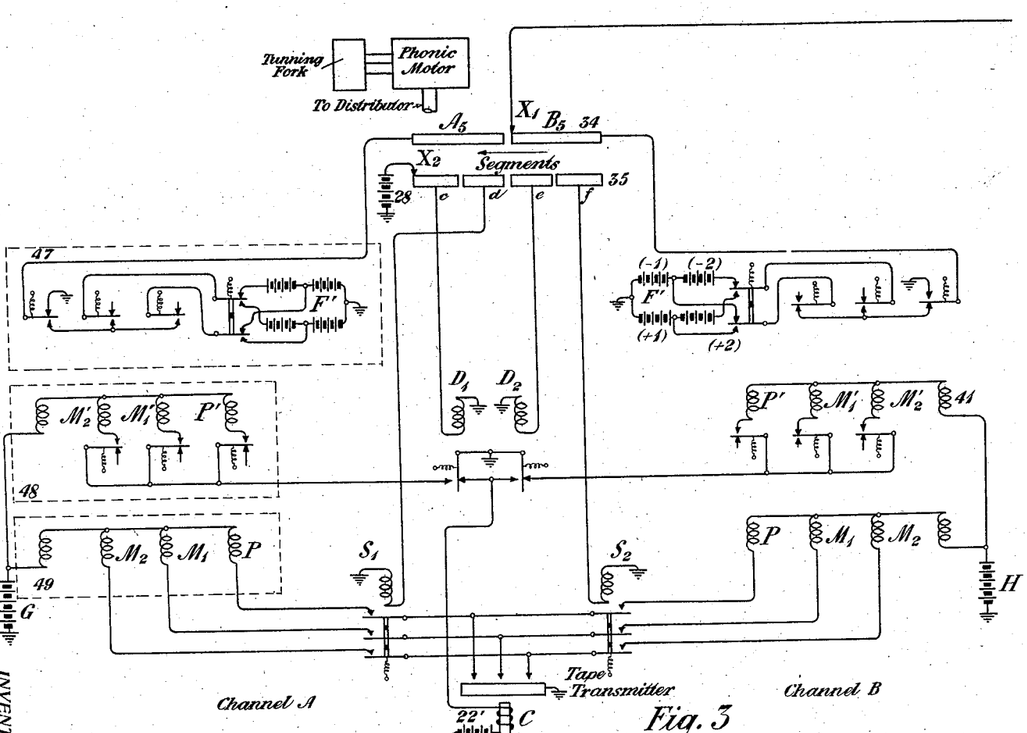
Fig. 3 is a diagram showing two channels thrown into a single message channel.
Figure 3A:
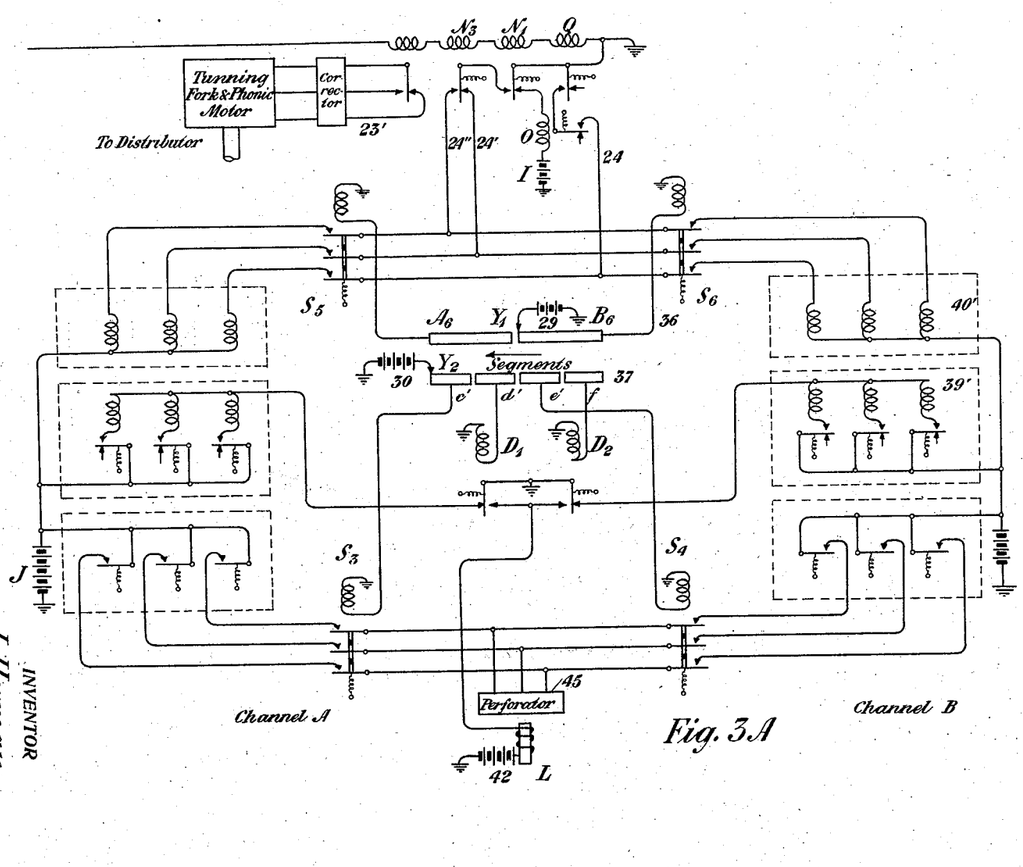

Whereas Figs. 1 and 2 provide for multiplex transmission, that is, for the transmission of two messages in the same direction by alternately connecting the line for one channel or the other, Fig. 3 discloses a modification to utilize the line time effectively for a single channel. At the sending station, a two-ring distributor is shown, each of the rings being developed in the drawing according to a familar convention. The ring 34 controls the connection to the line circuit, taking the place of the relay E in Figs. 1 and 2. The ring 35 controls local switching arrangements as will appear presently.

In a general way, the sending selector relays of Fig. 3 are similar to those for Figs. 1 and 2, with the addition that in Fig. 3 locking circuits are introduced. Another difference is that the different current magnitudes are determined by the application of different battery strengths instead of by interposed resistances. As shown in Fig. 3, the swtiches $S_2$ have just opened after being closed by contact of the segment $f$ with the brush $X_2$. According to the combination in the tape at 22', the magnets P, $M_1$ and $M_2$ at the right have just been energized and have locked up at P', $M'_1$ and $M'_2$, or some of these, through the locking circuit from battery H and through the back contact of relay $D_2$. As shown in Fig. 3, only relay $M'_1$ is locked up to correspond with the code for current of strength —1. The relay 41 is energized whenever any one of the relays P', $M'_1$ or $M'_2$ is energized. Accordingly, the circuit is established which can readily be traced as follows: from ground, through the —1 part of battery F', back contact of relay P', front contact of relay $M'_1$, front contact of relay 41, distributor segment $B_5$, brush $X_1$ to the line.

At the same time that this circuit is established, brush $X_2$ is engaged by distributor segment $c$ and connects the battery 28 to relay $D_1$, operating its armature to the position shown in Fig. 3. Accordingly, at this armature, the locking circuit of the selector relays of channel A are opened and the combination which had previously been transmitted to the line for channel A is released. Also, the armature of relay $D_1$ connects ground to close the circuit for the tape feed magnet 22' and the tape is stepped ahead one step.

When the distributor segment $B_5$ has passed about half way under the brush $X_1$, the segment $c$ leaves the brush $X_2$ and the segment $d$ engages the brush $X_2$. This causes the relay $D_1$ to deenergize and causes the switches $S_1$ to close, so that the combination established in the tape transmitter in the preceding quarter-cycle (while segment $c$ engaged brush $X_2$) is now put into the relays P, $M_1$ or $M_2$, or some of these, for channel A, and this combination is locked up in the windings P', $M'_1$, or $M'_2$, or some of these, and the armatures of these relays are shifted accordingly in readiness to put the corresponding current impulses upon the line when the segment $A_5$ shall engage with the brush $X_1$.

As the brush $X_2$ is left by the segment $d$ and engaged by the segment $e$, the switches $S_1$ open, leaving the combination locked up in the windings $P'$, $M'_1$ and $M'_2$ and at the same time the segment $A_5$ engages the brush $X_1$ and the corresponding impulse is put on the line.

At the receiving station, the current from the line passes through the relays in series just as for Fig. 1. During the transmission in channel B, the impulse being $-1$, the armature of relay Q will be thrown to the open circuit condition but the armature of relay $N_1$ will close, thus establishing a circuit from ground, through conductor 24'. At this time the brush $Y_1$ applies the battery 29 through the distributor segment $B_6$ to the switch $S_6$, so that the conductor 24' is connected to the corresponding winding of one of the relays 40'. The two armatures of this relay 40' then lock up through one of the corresponding windings 39', the armature of relay $D_2$ being on its back contact at this time. Thus it will be seen that the received current impulse of strength $-1$ has its effect stored up in the corresponding relay 39'.

At the same time that the brush $Y_1$ engages the distributor segment $B_6$, the brush $Y_2$ goes into engagement with distributor segment $c'$, thus applying the battery 30 to actuate the switch $S_3$. While the brush $Y_1$ was in engagement with distributor segment $A_6$, combination was stored up in the armatures for the storing relays in the A channel as has just been described for the B channel. Whatever this combination was, the closure of the switch $S_3$ closes the corresponding circuits to the perforator 45 and the tape is perforated accordingly. Then when the brush $Y_2$ is engaged by the distributor segment $d'$, the switch $S_3$ opens and the relay $D_1$ is energized, putting ground to the tape feed magnet 42 and stepping the tape along one step. When the brush $Y_1$ passes from engagement with distributor segment $B_6$ to segment $A_6$, the switch $S_6$ is opened and the switch $S_5$ is closed. The combination set up and locked up in the storing relay winding 39' at the right remains there, and it is then perforated just as has been described for channel A.

As explained for Fig. 1, a convenient code may be made up by employing two successive combinations on the tape to give twenty-five different resultant combinations. It will be seen that the system of Fig. 3 provides for a single message channel but it provides for very rapid sending. While one combination is being sent as an impulse on the line, the next combination is being set up in the relays all ready to be applied to the line and the line time is effectively economized.

Figure 4:
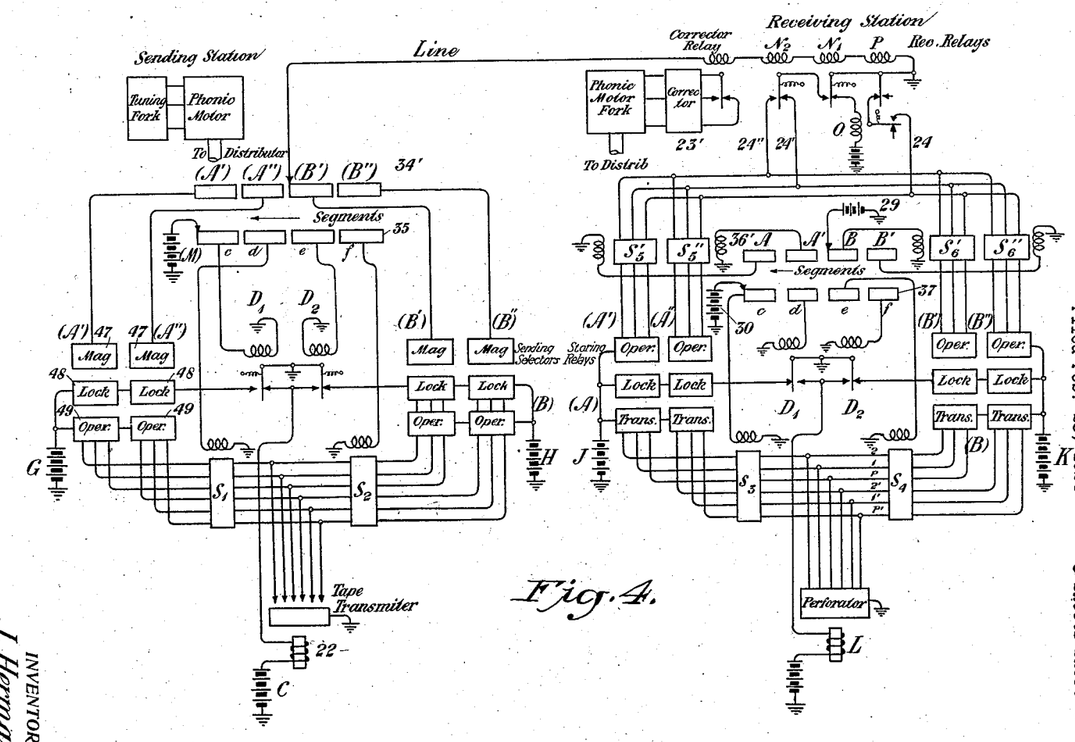
Fig. 4 is a diagram showing the utilization of two channels in another way for sending a single message.
Figure 11:
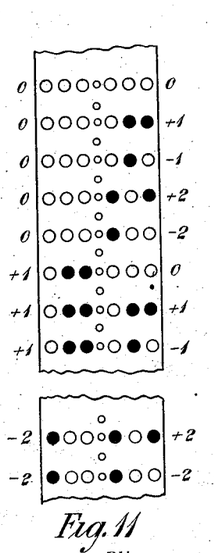

Referring to Fig. 4, this shows a system arranged for operation with a tape of the character shown in Fig. 11. It will be seen that in each position this tape has six holes (or places for holes). As will appear from the following explanation, these six hole positions on the tape are to be regarded in two groups of three each, and each group of three is to be compared with a group of three in Fig. 1. Just as for Fig. 1, three holes of the tape of Fig. 11 give five different combinations. The remaining three holes of the same position on the tape give five combinations and the complete set of six holes gives twenty-five combinations which may conveniently represent the characters to be transmitted by resorting to a "line shift" to get one of the less used characters.

A complete cycle on the line may be readily perceived by noticing the distributor rings 34' and 35'. In such a cycle there are four units of line time. The ring 35' in Fig. 4 and its associated apparatus are the same as for the ring 35 and its associated apparatus in Fig. 3. But the ring 34' in Fig. 4 may be looked upon as derived from Fig. 3 by bisecting each of the segments $A_5$ and $B_5$ of the ring 34 of Fig. 3, and duplicating the associated apparatus. Thus the three dotted rectangles of Fig. 3 designated 47, 48 and 49 will be found each duplicated in Fig. 4.

Accordingly, it will be seen that for the two combinations side by side in the tape of Fig. 4, two respective successive current impulses will be put on the line, the first by means of the segment $A'$ of the ring 34' the second by means of the segment $A''$ of the ring 34'.

At the receiving station, comparing Fig. 4 with Fig. 3, it will be seen that the segments $A_6$ and $B_6$ of the distributor ring 36 of Fig. 3 have each been bisected as seen in Fig. 4 and that the selector switches controlled thereby have been duplicated, that is, $S'_5$ and $S''_5$ in Fig. 4 take the place of $S_5$ in Fig. 3, etc.

As shown in Fig. 4, transmission on the B' channel has just started and will be followed by transmission on the B" channel. The corresponding combinations will be stored in the B' and B" apparatus, respectively, at the right in Fig. 4, and at the end of the transmission of those two impulses, the switches $S_4$ will be closed and both combinations will be punched simultaneously and side by side in the tape by the perforator. With the foregoing explanation it is thought that the operation of the apparatus of Fig. 4 will be entirely obvious after the disclosure that has been given in connection with the preceding figures of the drawings.

Figure 5:
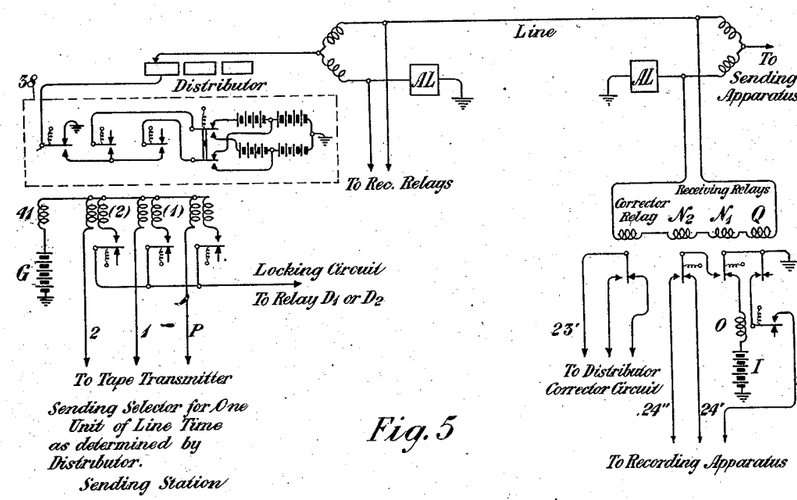
Fig. 5 is a diagram showing a modification for a bridge polarduplex line.

Referring to Fig. 5, this shows a bridge polar-duplex telegraph circuit adapted for transmission with five magnitudes of current, namely, 0, +1, −1, +2 and −2. The impedance to ground at the terminals must remain constant so as not to affect the duplex balance at the distant station. Therefore, it is not practicable to obtain the different current magnitudes by the use of resistances such as $R_1$ and $R_2$ in Fig. 1, and the different current magnitudes are obtained by employing different battery strengths, as already explained for Fig. 3. The auxiliary relay 41 is provided to establish a ground connection for zero current transmission. It will be noticed that the relay 41 connects the line to ground only when non-operated, which condition occurs when none of the selector relays is operated. In case a selector relay is operated, however, the current flowing from battery G through the operating or holding windings of that particular selector relay will also flow through the windings of relay 41 and will disconnect the line from ground and connect it to the selector relay contacts.

At the receiving end, the various receiving relays are connected across the bridge points of the duplex set, as clearly shown in the drawing, and beyond this stage the operation is the same as for Fig. 1.

Figure 6:
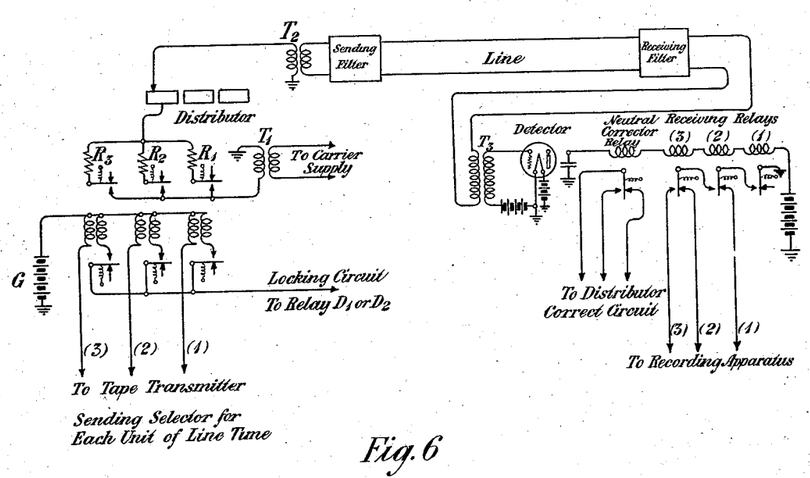
Fig. 6 is a diagram showing an embodment of my invention in connection with a carrier current system.
Figure 12:
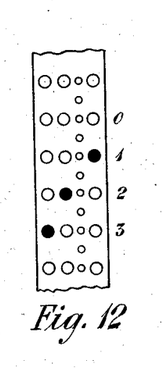

Fig. 6 shows the application of my invention in connection with a carrier current system. Polarity discrimination is not employed in this case but four different current magnitudes are used, namely, 0, 1, 2 and 3. A tape is used such as that shown in Fig. 12. The essential difference from the earlier disclosures of this specification lies in the application of the current to the line, the selector relays being operated the same as in the disclosures that have been made heretofore. The carrier supply current is stepped up or down in voltage at the transformer $T_1$ and its magnitude is then determined by the resistances $R_1$, $R_2$ or $R_3$ and it is applied through the appropriate distributor segment and the transformer $T_2$ and through the sending filter to the line. At the receiving station, the carrier current goes through the receiving filter and the transformer $T_3$ to an audion detector. The output current from this detector goes through relays corresponding to the receiving relays on the line in Fig. 1.

Figure 7:
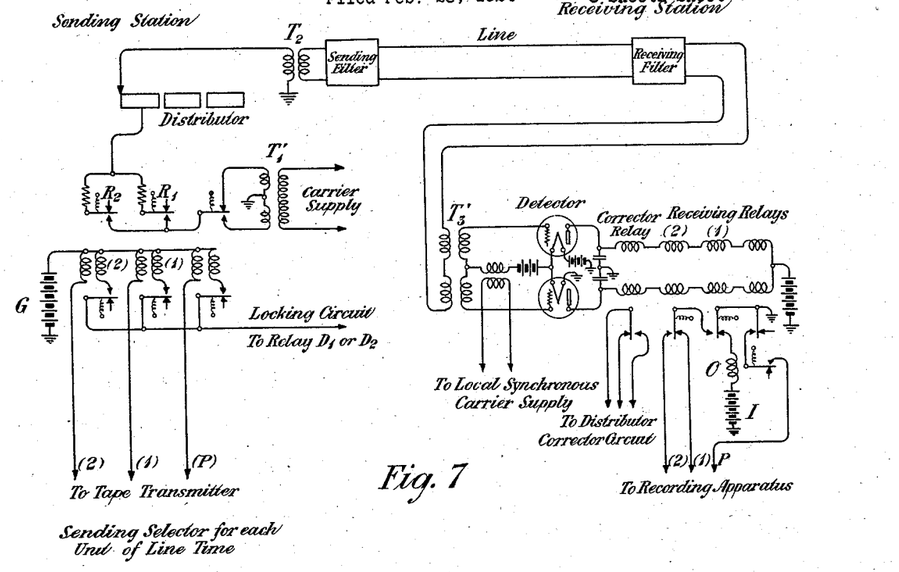
Fig. 7 is a diagram corresponding to Fig. 6 but with the addition of discrimination as to reversals of the carrier current.

Fig. 7 shows my invention in connection with a carrier current system with provision for polarity discrimination. In this system a tape like that of Fig. 9 is employed and five current magnitudes are involved, namely 0, +1, −1, +2 and −2. It will readily be seen that the polarity determining relay determines the phase of the carrier current, putting on a current of one phase or another of opposite phase according as the relay is operated or non-operated.

At the receiving station there is a local supply of alternating current in phase with the carrier supply at the sending end, the synchronism being established and maintained by methods well known in the art of carrier current telegraphy. Both the received current and the local supply of current are applied to a detector of the push-pull type and the phase reversal in the current received from the line give reversals of the current in the receiving relay windings. The circuits controlled by the receiving relays are the same as already described for Fig. 1.

Figure 8:
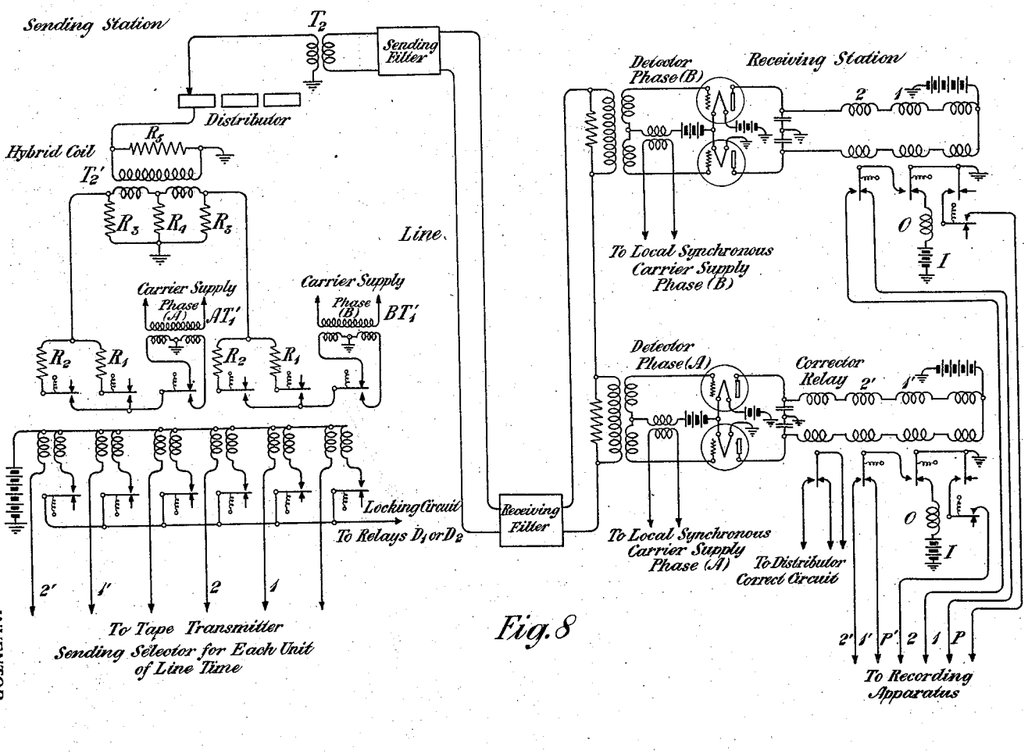
Fig. 8 is a diagram similar to that of Fig. 7 but with transmission on each of two carrier currents in quadrature.

Referring to Fig. 8, this shows a system in which two carrier current channels of the same frequency are employed by using two carrier currents 90 degrees apart in phase. These are referred to in Fig. 8 as "phase A" and "phase B". Each of these phases is controlled as shown in Fig. 7 and the tape employed is of the kind shown in Fig. 11. The hybrid coil or three-winding transformer $T'_3$ is employed at the sending station to combine the transmitted currents of the two phases. In this way each of those currents is prevented from feeding back in the generator circuit of the other current. The transmission is by means of a tape transmitter corresponding to the tape of Fig. 11.

At the receiving station there are two local current supplies, respectively in phase with the carrier supplies A and B at the sending station. Respective push-pull detectors are used and in each of them the current in phase adds to or subtracts from the local supply to give an effective indication in the output circuit, while the current in quadrature is of only negligible effect to vary the magnitude of the detector output currents. The circuits controlled by the relays in the detector output circuits lead to a perforator corresponding to the kind of tape shown in Fig. 11.

In accordance with my invention, magnitude discrimination is employed to increase the speed in a telegraph circuit or channel rather than to increase the number of messages that can be transmitted simultaneously. If the number of different magnitudes of current that can be employed alternatively in a unit of line time is $n$, and if the number of letters or characters to be distinguished is P, then the number $x$ of units of line time that will be necessary for a letter or character will be given by the equation $n^x = P$ from which it is readily deduced that the speed of the line (which is proportional to the reciprocal of $x$) varies as $\log n$. This is the law of the increase of speed in a single channel attainable by increasing the magnitude discrimination in that channel.

If instead of getting the highest possible speed in a single message channel, it is desired to increase the number of message channels by magnitude discrimination, this can readily be accomplished by the use of the multiplex system with distributors. Thus referring to Fig. 1, instead of the relays E and D connecting the line alternately to two channels, distributor rings could be employed connecting to any number of channels.

I claim:

1. The method of telegraph signaling by means of a single message train of impulses which consists in transmitting successive current impulses of said train, each impulse having any one of $n$ different magnitudes where $n$ is a number greater than 3, and at the sending end preparing one set of apparatus for sending one impulse while another set of apparatus is sending the preceding impulse of the same message train and connecting these sets of apparatus to the line in cyclic succession.

2. The method of telegraph signaling by means of a single message train of impulses which consists in transmitting successive current impulses of said train, each impulse having any one of $n$ different magnitudes where $n$ is a number greater than 3, and at the receiving end registering one impulse in one set of apparatus while another set of apparatus is being prepared to receive the next succeeding impulse of the same message train and connecting these sets of apparatus to the line in cycle succession.

3. The method of telegraph signaling by means of a single message train of impulses which consists in transmitting successive current impulses of said train, each impulse having any one of $n$ different magnitudes where $n$ is a number greater than 3, and at the sending end preparing one set of apparatus for sending one impulse while another set of apparatus is sending the preceding impulse of the same message train and at the receiving end registering one impulse in one set of apparatus while another set of apparatus is being prepared to receive the next succeeding impulse of the same message train and connecting the sets of apparatus to the line at the sending and receiving ends in cyclic succession at each end, and in synchronism at both ends.

4. The method of telegraph signaling by means of a single message train of impulses which consists in transmitting successive current impulses of said train, each impulse having any one of at least four different current values, and at the sending end locking up a relay combination to determine the current value of one impulse while the preceding impulse of the same message train is being sent according to the value determined by another set of relays, and operatively connecting these sets of relays in cyclic succession.

5. The method of telegraph signaling by means of a single message train of impulses which consists in transmitting successive current impulses of said train, each impulse having any one of at least four different current values, and locking up a set of relays at the receiving end to correspond to the current value of a received impulse while the previously received impulse of the same message train is being perforated from another set of relays locked up to correspond thereto, and operatively connecting the said sets of relays with the line in cyclic succession.

6. The method of telegraph signaling which consists in transmitting successive current impulses, each impulse having any one of several different magnitudes, at the sending end preparing one set of apparatus for sending one impulse while another set of duplicate apparatus is sending the preceding impulse of the same message train and connecting these sets of apparatus to the line in cyclic succession.

7. In combination, a line, two duplicate sets of sending apparatus associated therewith, means to adjust these sets one at a time according to impulses of a single message train to be sent, and means alternately to connect them to the line to send such impulses.

8. The method of telegraph signaling which consists in transmitting successive current impulses, each impulse having any one of several different magnitudes, at the receiving end preparing one set of apparatus for recording according to a received impulse while another set of duplicate apparatus is recording the preceding impulse of the same message train and connecting these sets of apparatus to the line in cylic succession.

9. In combination, a line, two duplicate sets of receiving apparatus associated therewith, means to connect these sets with the line one at a time and thereby adjust them respectively according to single impulses of a single message train received from the line, and means alternately to make records from the sets according to the adjustments therein.

10. The method of telegraph signaling which consists in transmitting successive current impulses, each impulse having any one of several different magnitudes, at the sending end preparing one set of apparatus for sending one impulse while another set of duplicate apparatus is sending the preceding impulse of the same message train and connecting these sets of apparatus to the line cyclic succession, and at the receiving end preparing one set of apparatus for recording according to a received impulse while another set of duplicate apparatus is recording the preceding impulse of the same message train, and connecting these sets of receiving apparatus to the line in cyclic succession and in synchronism with the connection of the said sets of sending apparatus.

11. In combination, a line, two duplicate sets of sending apparatus associated therewith, means to adjust these sets respectively one at a time according to single impulses of a single message train to be sent, means alternately to connect them to the line to send such single impulses, also two duplicate sets of receiving apparatus associated with said line, means to connect these sets with the line one at a time in synchronism with the connection of the said sets of sending apparatus and thereby adjust them respectively according to single impulses received from the line, and means alternately to record from the sets according to the adjustments therein.

In testimony whereof, I have signed my name to this specification this 26th day of February, 1924.

JOSEPH HERMAN.